United States Patent
Koane-Yane

(10) Patent No.: US 12,157,557 B2
(45) Date of Patent: Dec. 3, 2024

(54) RETRACTABLE AIRCRAFT LANDING GEAR PROVIDED WITH A STRUT HAVING AN INTEGRATED ACTUATOR

(71) Applicant: SAFRAN LANDING SYSTEMS, Velizy Villacoublay (FR)

(72) Inventor: Thomas Koane-Yane, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 102 days.

(21) Appl. No.: 17/926,344

(22) PCT Filed: May 19, 2021

(86) PCT No.: PCT/EP2021/063228
§ 371 (c)(1),
(2) Date: Nov. 18, 2022

(87) PCT Pub. No.: WO2021/233963
PCT Pub. Date: Nov. 25, 2021

(65) Prior Publication Data
US 2023/0192275 A1    Jun. 22, 2023

(30) Foreign Application Priority Data

May 20, 2020    (FR) ........................................ 2005320

(51) Int. Cl.
*B64C 25/20*    (2006.01)
*B64C 25/22*    (2006.01)

(52) U.S. Cl.
CPC .............. *B64C 25/22* (2013.01); *B64C 25/20* (2013.01)

(58) Field of Classification Search
CPC .......... B64C 25/10; B64C 25/20; B64C 25/22
See application file for complete search history.

(56) References Cited

U.S. PATENT DOCUMENTS

| 2,959,381 A | * | 11/1960 | Hartel | .................... | B64C 25/20 |
| | | | | | 244/102 R |
| 2018/0001997 A1 | * | 1/2018 | Ducos | .................... | B64C 25/10 |
| 2020/0094950 A1 | * | 3/2020 | Bennett | .................. | B64C 25/20 |

FOREIGN PATENT DOCUMENTS

| BE | 414427 A | 4/1936 |
| EA | 3263450 A1 | 1/2018 |
| GB | 529460 A | 11/1940 |

OTHER PUBLICATIONS

International Search Report for PCT/EP2021/063228 dated Aug. 4, 2021.

* cited by examiner

*Primary Examiner* — Tye William Abell
(74) *Attorney, Agent, or Firm* — Sughrue Mion, PLLC

(57) ABSTRACT

An aircraft undercarriage includes a leg for mounting on a structure of the aircraft so as to be movable between a deployed position and a retracted position, the undercarriage being fitted with a breaker strut including two hinged elements that are hinged together at a knee, with a first element for coupling to the structure of the aircraft and a second element for coupling to the undercarriage, a return member being arranged between the two elements to urge them towards a substantially aligned position that is defined by respective abutments. According to the invention, one of the strut elements incorporates a linear actuator having a slidable rod that is coupled to the other strut element by means of a link, the assembly being arranged in such a manner that moving the slidable rod of the actuator in a single direction causes, in succession, the elements of the strut to move out of alignment and the undercarriage to move from the deployed position to the retracted position.

7 Claims, 9 Drawing Sheets

RETRACTABLE AIRCRAFT LANDING GEAR PROVIDED WITH A STRUT HAVING AN INTEGRATED ACTUATOR

This Application is a National Stage of International Application No. PCT/EP2021/063228 filed May 19, 2021, claiming priority based on French Patent Application No. 2005320 filed May 20, 2020, the contents of each of which being herein incorporated by reference in their entireties.

BACKGROUND OF THE INVENTION

On high-speed aircraft, undercarriages are designed to be retractable in flight. Each undercarriage is thus mounted to be movable (usually pivotable) between a deployed position and a retracted position in which the undercarriage is stored in a well of the aircraft.

In order to stabilize the undercarriage in the deployed position, use is made of a brace member, referred to as a "strut", that is coupled between the structure of the aircraft and the leg of the undercarriage, and that can be stiffened when the undercarriage is in the deployed position so as to create an assembly that is rigid, since it is triangulated by the strut, thereby holding the undercarriage in the deployed position.

Known struts include "breaker" struts, which comprise two elements that are hinged together, one of the elements being coupled to the structure of the aircraft and the other element being coupled to the leg of the undercarriage. When the undercarriage reaches the deployed position, the two elements of the strut come into a position in which they are substantially in alignment, and they are locked automatically in this position, thereby stabilizing the undercarriage in the deployed position. The hinge (or "knee") of the strut enables this alignment to be broken when raising the undercarriage in order to allow the undercarriage to move freely from the deployed position to the retracted position.

A breaker strut is locked in its substantially aligned position by a lock that is internal (e.g. in the nose undercarriage of the ATR42 airplane), or that is external in the form of a secondary strut coupled to the main strut (e.g. on the nose undercarriage of the Airbus A320 airplane). Locking may also be performed merely by the elements of the strut being urged by springs towards the substantially aligned position as defined by abutments.

In order to be able to raise the undercarriage towards the retracted position, the undercarriage needs to be provided both with an unlocking actuator in order to cause the strut to go from the substantially aligned position to a broken position, and also with an operating actuator for raising the undercarriage towards the retracted position. It is therefore necessary to manage the sequence in which those two actuators are activated.

OBJECT OF THE INVENTION

The invention seeks to propose an undercarriage that is provided with a breaker strut and that is simple to implement.

SUMMARY OF THE INVENTION

In order to achieve this object, there is provided an aircraft undercarriage including a leg for mounting on a structure of the aircraft so as to be movable between a deployed position and a retracted position, the undercarriage being fitted with a breaker strut comprising two hinged elements that are hinged together at a knee, with a first element for coupling to the structure of the aircraft and a second element for coupling to the undercarriage, a return member being arranged between the two elements to urge them towards a substantially aligned position that is defined by respective abutments. According to the invention, one of the strut elements incorporates a linear actuator having a slidable rod that is coupled to the other strut element by means of a link, the assembly being arranged in such a manner that moving the slidable rod of the actuator in a single direction causes, in succession, the elements of the strut to move out of alignment and the undercarriage to move from the deployed position to the retracted position.

The term "incorporates" is used to mean that the linear actuator is entirely integral with the associated strut element, either by being fitted thereto by screw fastening or any other fastener means, or else by having a body that constitutes the strut element directly. Under such circumstances, the body of the actuator carries directly both the hinge with the other element of the strut, and also the hinge with that one of the undercarriage and the structure to which the body is coupled, which means that the body of the actuator is a structural element of the strut.

Thus, the undercarriage has only one actuator that serves both to unlock the strut and to raise the undercarriage towards the deployed position. The actuator is incorporated in one of the elements of the strut, such that no additional hinge is necessary.

In a first particular embodiment, the rod slides along a sliding axis that is contained in a plane defined by hinge axes of the strut element in which it is incorporated.

According to another particular aspect of the invention, the linear actuator is incorporated in that one of the strut elements that is coupled to the leg of the undercarriage.

According to yet another particular aspect of the invention, that one of the strut elements that does not carry the linear actuator has the general shape of a panel.

In a second particular embodiment of the invention, the rod slides along a sliding axis that does not lie in a plane defined by hinge axes of the strut element in which it is incorporated.

According to yet another particular aspect of the invention, the abutments comprise firstly the end of a tab projecting from the strut element carrying the linear actuator, and secondly the end of the link that is hinged to the other strut element.

DESCRIPTION OF THE FIGURES

The invention can be better understood in the light of the following description of particular embodiments of the invention, given with reference to the figures of the accompanying drawings, in which.

DETAILED DESCRIPTION OF THE INVENTION

Figure 1:
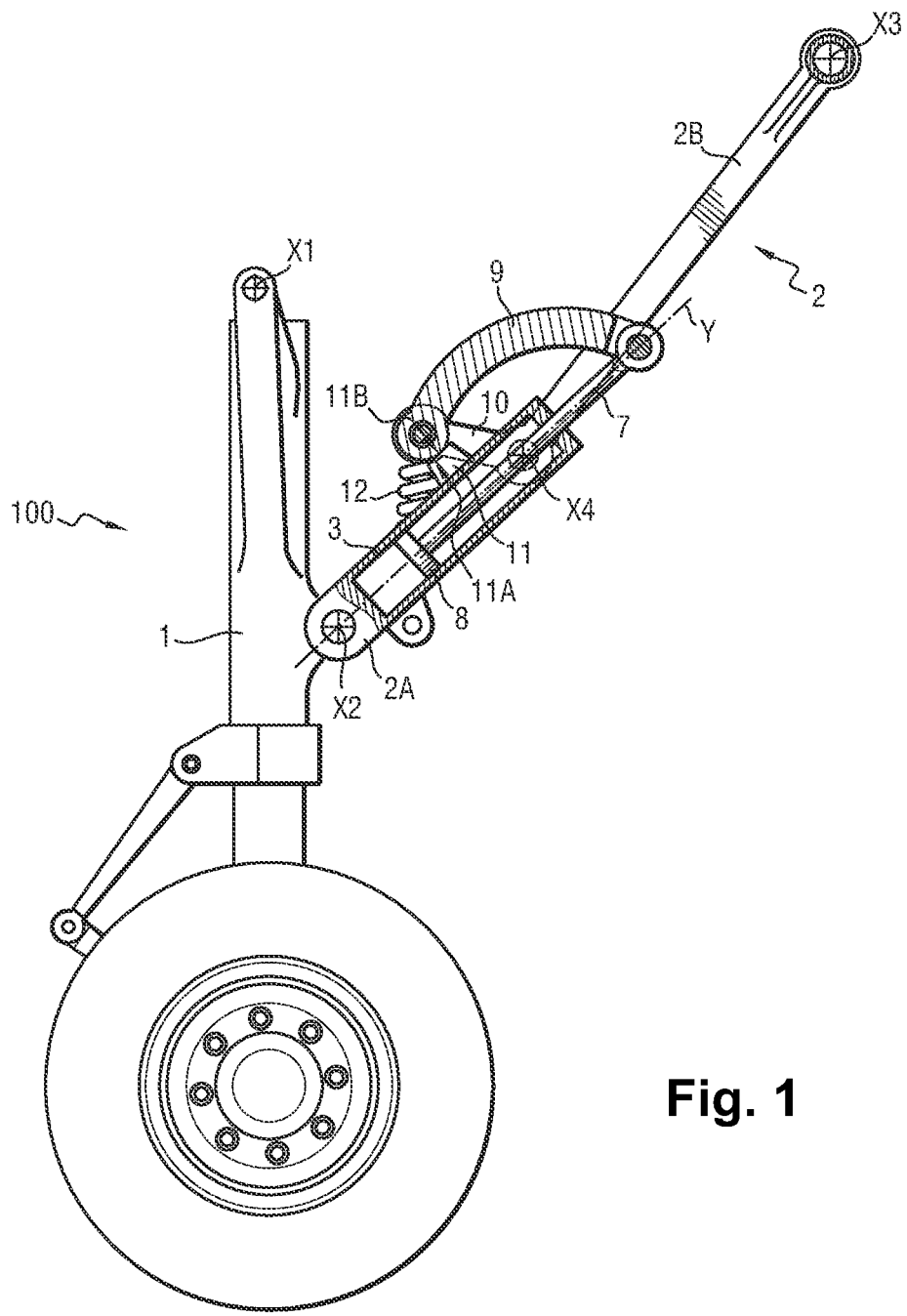
FIG. 1 is a diagrammatic side view of an aircraft undercarriage having a strut in a first particular embodiment of the invention.
Figure 2:
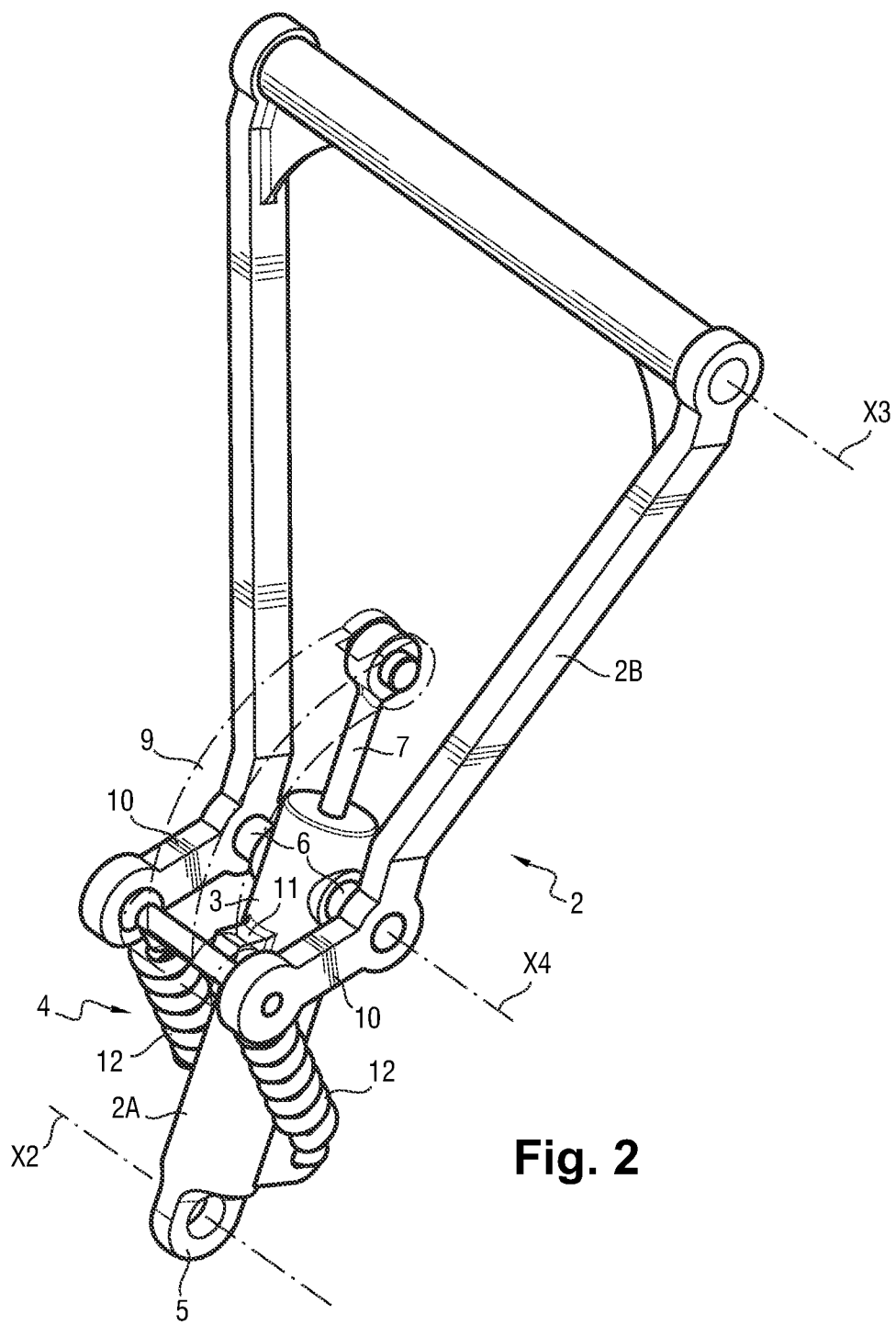
FIG. 2 is a perspective view of the strut fitted to the FIG. 1 undercarriage, the link being drawn in chain-dotted lines for greater clarity.

With reference to FIG. 1, the invention relates to an aircraft undercarriage 100 comprising a leg 1 carrying one or more wheels at its bottom end and hinge-mounted to a structure of the aircraft (not shown) about a hinge axis X1 (seen end-on in this figure). The leg 1 is stabilized in the deployed position by a breaker strut 2 comprising a lower element 2A hinged to the leg about a hinge axis X2, and an upper element 2B hinged to the structure of the aircraft about a hinge axis X3, the two elements 2A and 2B being hinged to each other about a hinge axis X4. In this example, all of the hinge axes are parallel to one another. As can be seen in FIG. 2, the upper strut element 2B is generally in the shape of a panel, while the lower strut element 2A is essentially constituted by the cylinder body 3 of a hydraulic actuator 4 carrying a lug 5 at its end for hinging to the leg 1 about the hinge axis X2, and having trunnions 6 for hinging to the upper strut element 2B about the hinge axis X4. Thus, the body 3 of the actuator 4 forms the structure of the strut element 2A and carries the members for coupling it to the leg 1 and to the upper strut element 2B. Inside the body 3, there is mounted a slidable rod 7 associated with a piston 8 that is mounted to slide in sealed manner inside the body 3 in order to define two hydraulic chambers. In this example, the sliding axis Y of the slidable rod 7 is included in the plane that is defined by the hinge axes X2 and X4 of the lower element 2A, but this is not essential, as can be seen below with reference to FIGS. 8 and 9.

The end of the slidable rod 7 is coupled to the end of a link 9 that has its other end hinged to prongs 10 projecting from the upper strut element 2B. In this example, the link 9 is curved in shape in order to avoid any interference with the other parts of the strut, but where the configuration makes this possible, the link 9 could perfectly well be straight. Thus, the slidable rod 7 is coupled to the upper strut element 2B by means of the link 9.

Figure 3:
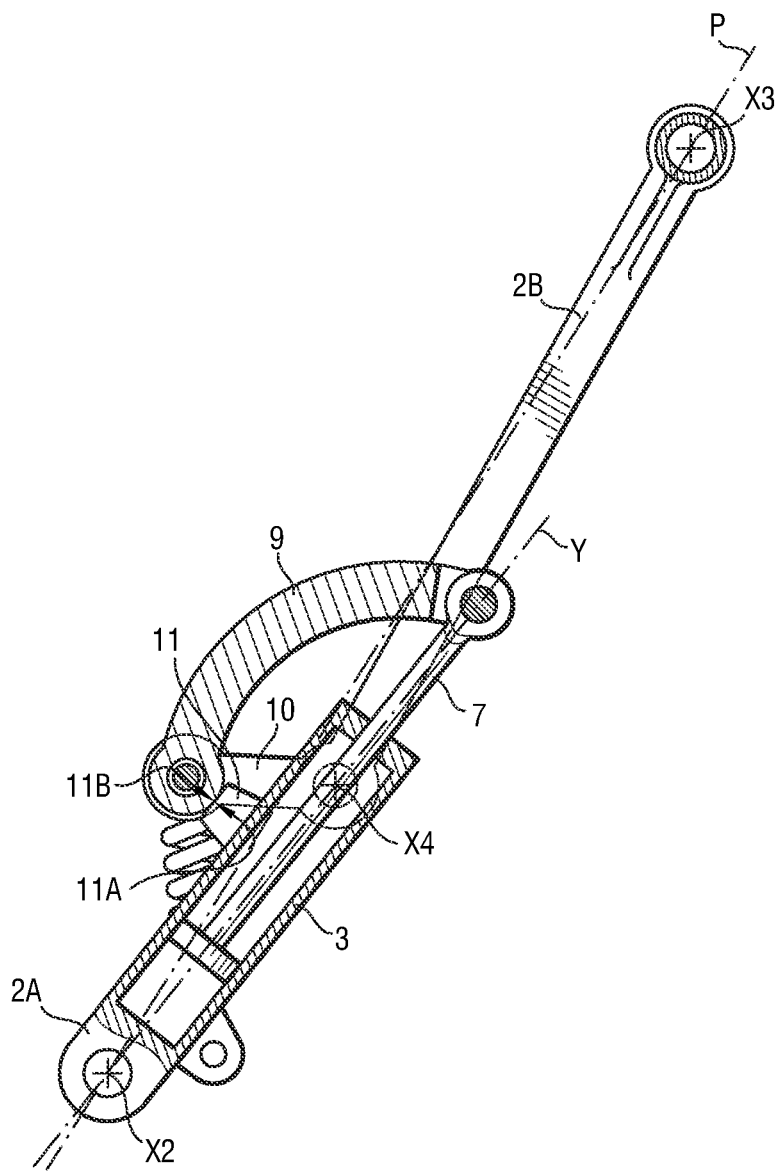
FIG. 3 is a section view of the FIG. 1 strut in the locked position.

Abutments are located to define a substantially aligned position of the strut elements 2A and 2B, as can be seen in FIGS. 1, 2, and 3. In this example, the substantially aligned position corresponds to an "over centered" position in which the hinge axis X4 has gone a little way beyond a plane P defined by the hinge axes X2 and X3. In this example, the abutments comprise the end 11A of a tag 11 projecting from the body 3 of the hydraulic actuator 4 and coming to press against the upper strut element 2B, specifically indirectly by coming into contact with the end 11B of the link 9 that is itself hinged to the upper strut element 2B. In entirely equivalent manner, the abutments 11A and 11B could be organized directly between the two strut elements 2A and 2B, or indeed between the link 9 and the upper strut element 2B, providing they define the substantially aligned position of these two strut elements. Return springs 12 are arranged between the two strut elements 2A and 2B in order to urge the two elements into abutment and thus hold them in the substantially aligned position. Thus, any movement of the leg 1 that extends the strut 2 gives rise at best to geometrical re-alignment in which the hinge axis X4 moves towards the plane P, but without ever going beyond it, with the two strut elements 2A and 2B coming back into abutment under drive from the return springs 12 as soon as this movement comes to an end. In contrast, any movement of the leg 1 that compresses the strut 2 confirms the abutment between the two strut elements 2A and 2B. The substantially aligned position is thus a position that is stable.

Figure 5:
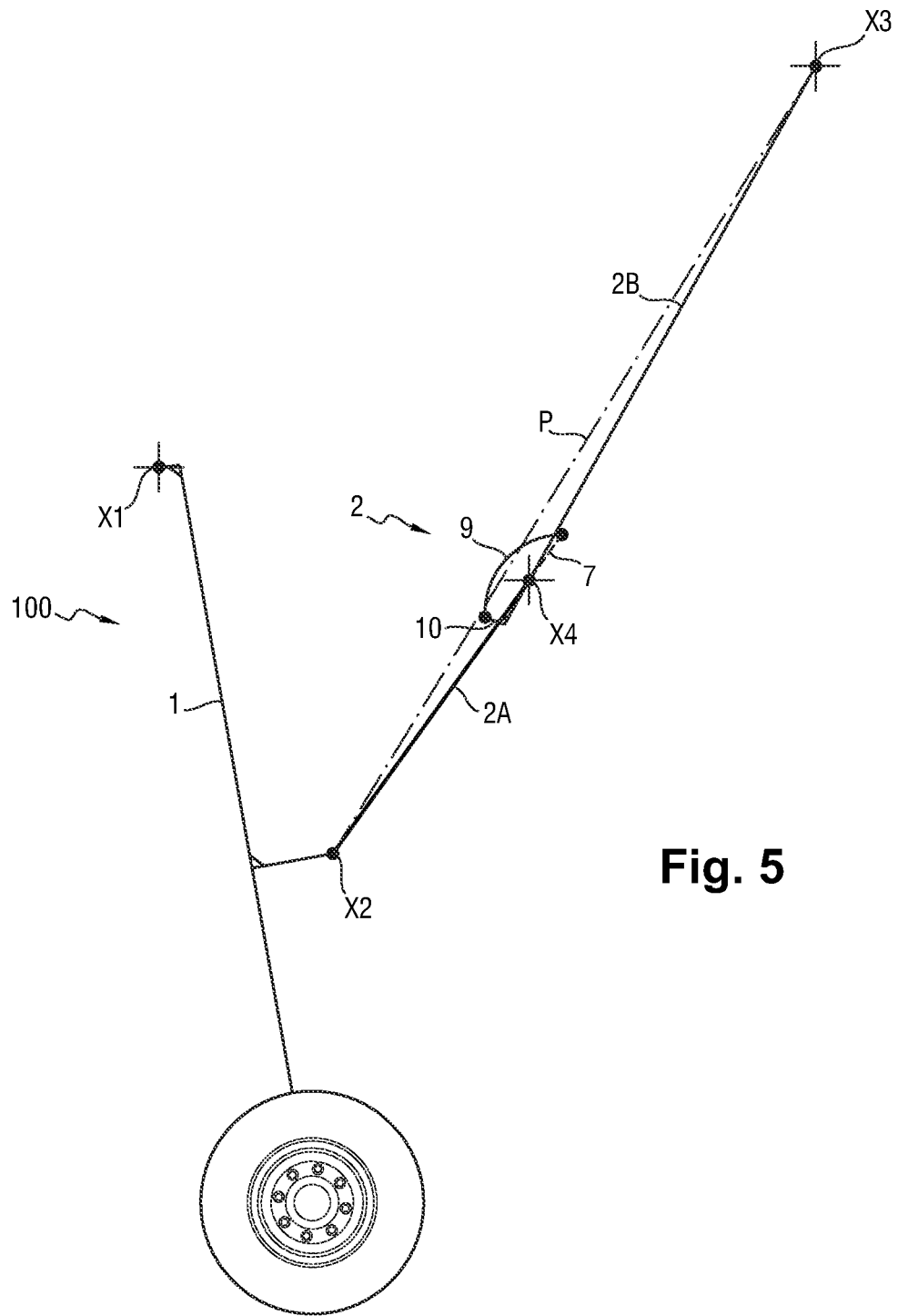
FIG. 5 is a diagrammatic view of the skeleton of the undercarriage and of the associated strut during raising, this figure showing the deployed position with the strut in the substantially aligned position.
Figure 6:
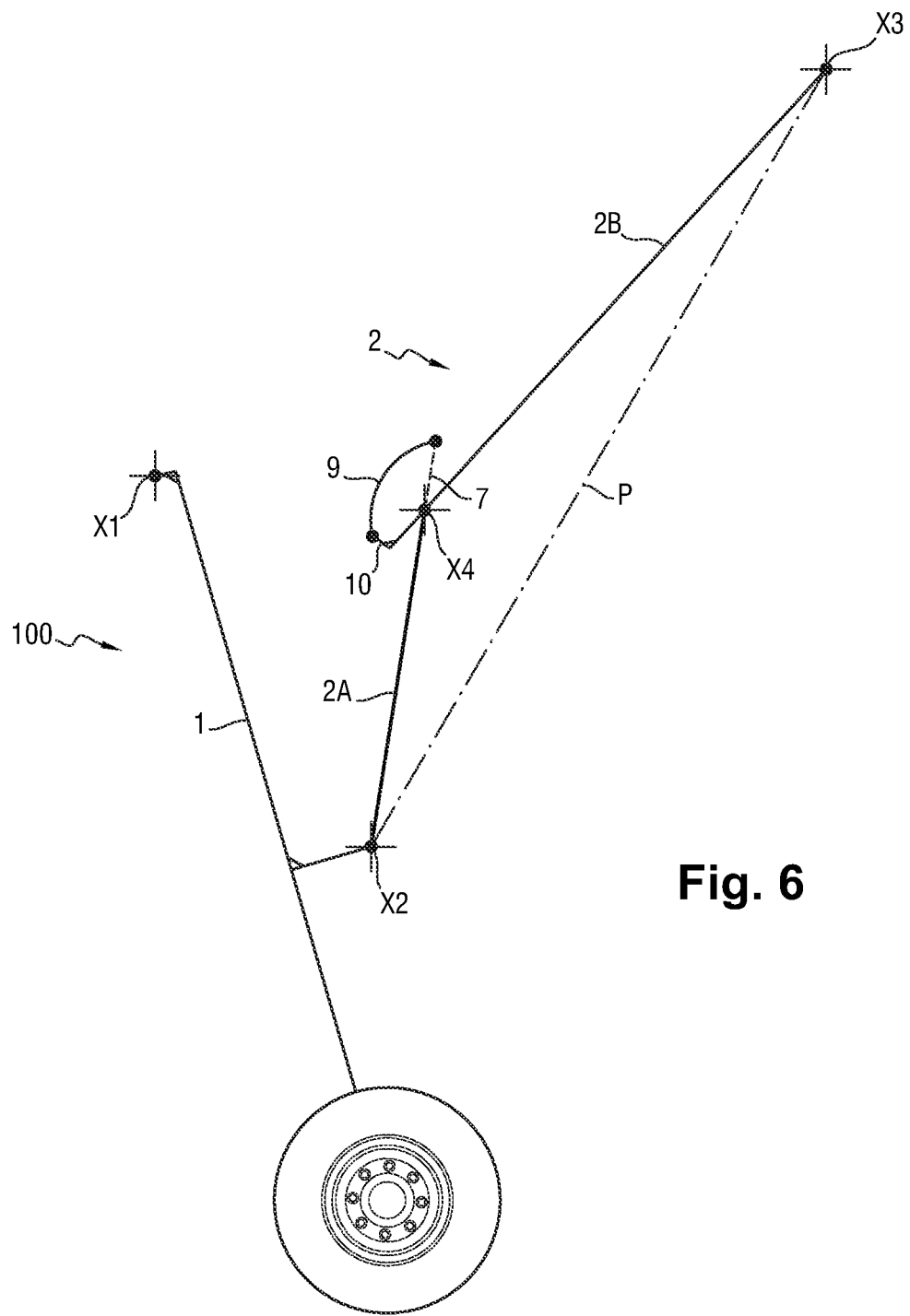
FIG. 6 is a diagrammatic view of the skeleton of the undercarriage and of the associated strut during raising, this figure showing the position during raising once the strut alignment is broken.
Figure 7:
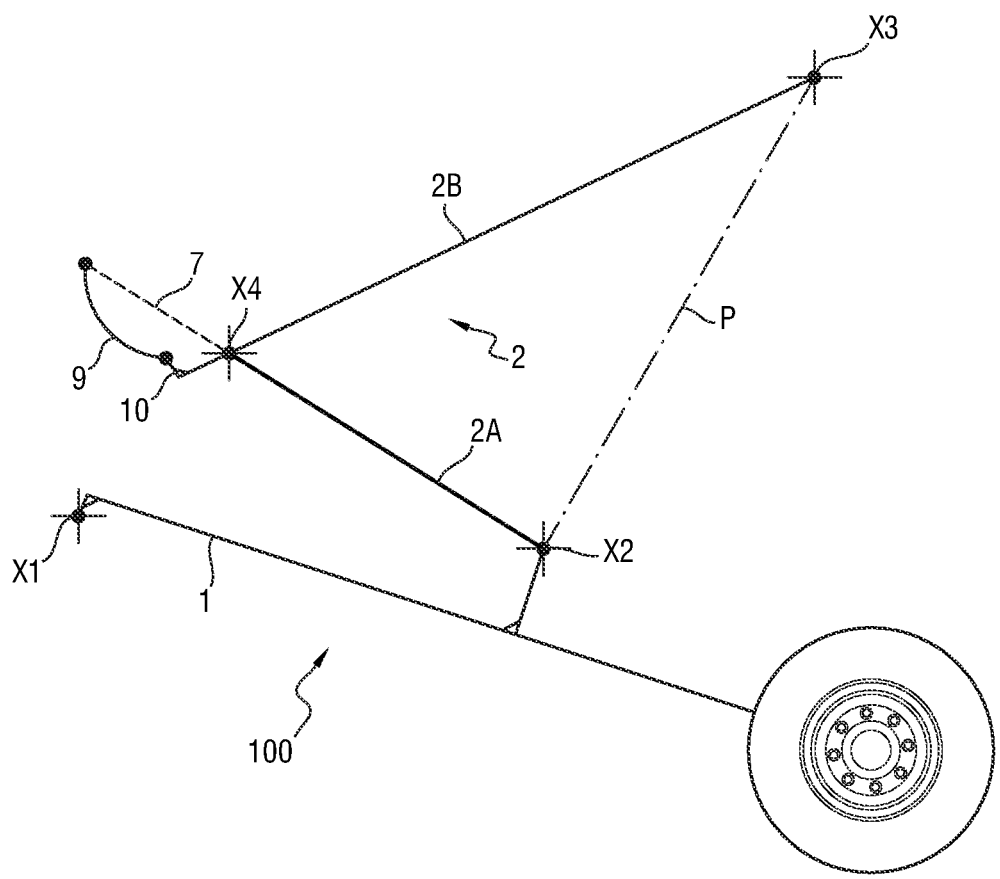
FIG. 7 is a diagrammatic view of the skeleton of the undercarriage and of the associated strut during raising, this figure showing the retracted position.

The operation of the strut of the invention is explained below with reference to FIGS. 5 to 7. The undercarriage 1 is initially in the deployed position as shown in FIG. 5 (which corresponds to the position shown in FIG. 1). In this position, the strut 2 is held in its substantially aligned position by the springs 12, which urge the two strut elements 2A and 2B into abutment. The strut 2 then forms a rigid assembly that triangulates the leg 1 in order to hold it in the deployed position. If necessary, this position may be confirmed by powering the hydraulic actuator 4 so as to retract the slidable rod 7.

Figure 4:
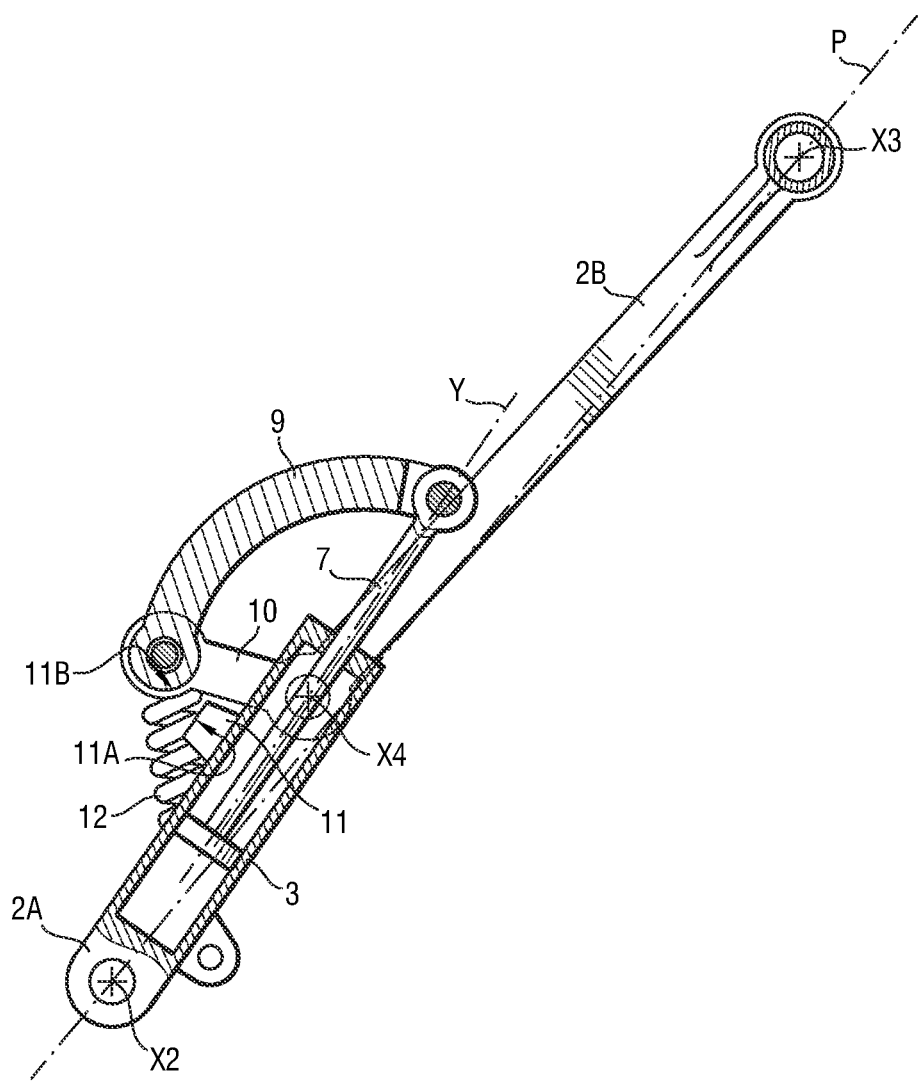
FIG. 4 is a view analogous to the view of FIG. 3, showing the strut in the unlocked position, the alignment of the strut being broken.

In order to break the alignment of the strut 2, and thus unlock the deployed position of the undercarriage, the hydraulic actuator 4 is powered in order to cause the slidable rod 7 to be extended. The rod then pulls the link 9, thereby causing the two strut elements 2A and 2B to move against the return springs 12 towards the broken position as shown in FIG. 6 and also in FIG. 4, in which figures it can be seen that the axis X4 of the knee of the strut has passed to the other side of the plane P defined by the hinge axes X2 and X3. The strut 2 is thus unlocked, such that the leg 1 is no longer held in the deployed position. Thereafter, by continuing to cause the slidable rod 7 to be extended, it continues to pull on the link 9, and thus to force the two strut elements 2A and 2B to fold, thereby causing the leg 1 to move towards the retracted position, as shown in FIG. 7. Thus, the same actuator 4 serves both to unlock and to raise the undercarriage towards its retracted position.

To perform the opposite movement, it suffices to allow gravity and aerodynamic forces to take the undercarriage downwards, with the rate of descent of the undercarriage towards its deployed position being regulated, if necessary, by throttling the fluid expelled from the full chamber of the actuator 4. The strut 2 re-aligns itself automatically under the effect of the springs 12.

Figure 8:
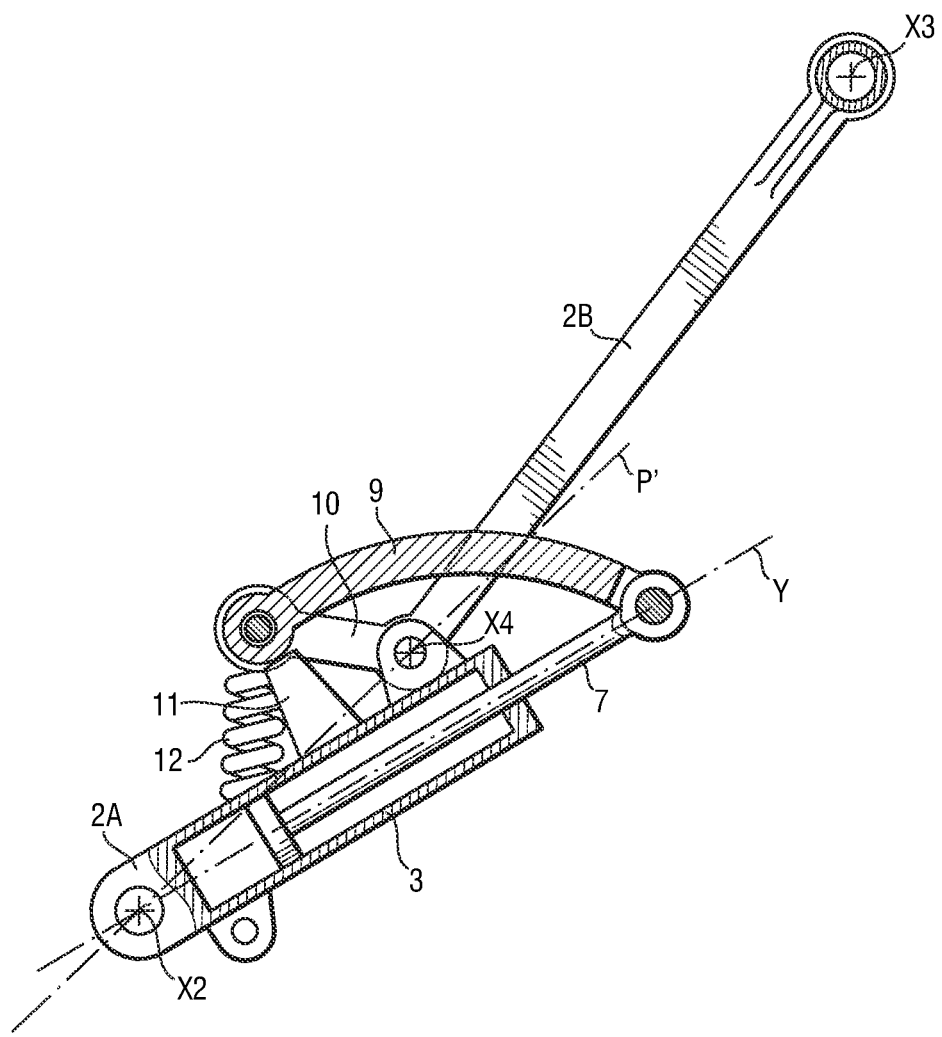
FIG. 8 is a view analogous to the view of FIG. 3 in a variant embodiment of the invention.
Figure 9:
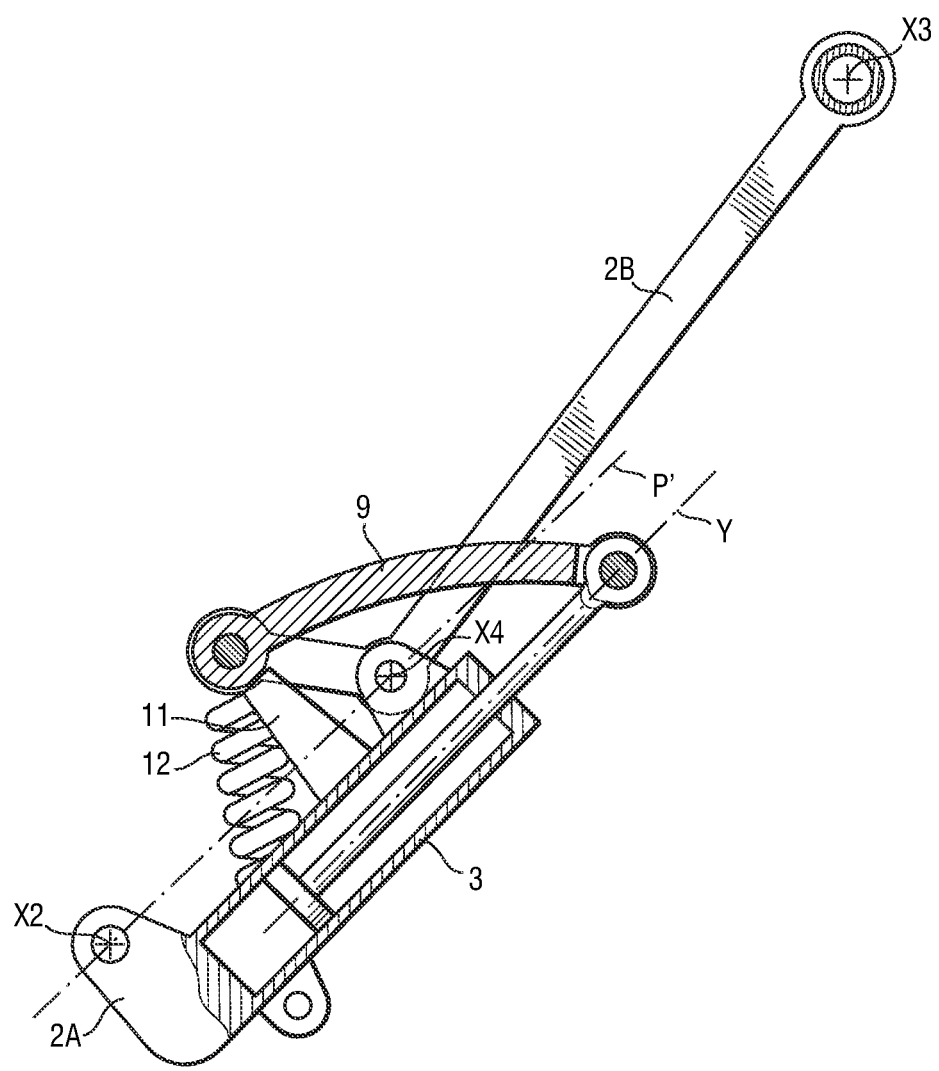
FIG. 9 is a view analogous to the view of FIG. 3 in another variant embodiment of the invention.

In the variant embodiments shown in FIGS. 8 and 9, it is possible to arrange the actuator 4 in such a manner that the sliding axis Y of the rod is not contained in the plane P' defined by the hinge axes X2 and X4 (in other words, the sliding axis Y of the rod does not lie in the plane P'). In the arrangement shown in FIG. 8, the sliding axis Y of the slidable rod 7 nevertheless still intersects the hinge axis X2, whereas in the arrangement shown in FIG. 9, the sliding axis Y does not intersect either of the hinge axes X2 and X4. This freedom of arrangement makes it possible to optimize the position of the sliding axis of the slidable rod relative to the hinge axes X2 and X4. Allowing the hinge axis X4 to be off the sliding axis Y also makes more options available for connecting the hinge X4.

The invention is not limited to the above description, but on the contrary covers any variant coming within the ambit defined by the claims.

In particular, although the linear actuator of the strut is described above as being a hydraulic actuator, it would be equally possible to use a linear actuator that is electric or electromechanical.

Although the strut element incorporating the linear actuator is described above as being the lower strut element that is connected to the leg of the undercarriage, it would naturally be possible for the linear actuator to be incorporated in the other strut element.

Although the body of the linear actuator is described above as carrying a lug and trunnions so that the body forms the structure of one of the strut elements, it would be possible, as an alternative, for the body of the linear actuator to be attached to the strut element in question, e.g. by means of screws or any other assembly means.

Finally, although in the description above it is necessary to cause the slidable rod to be extended in order to unlock and fold the strut, it would naturally be possible to provide a linkage in which the strut is unlocked and folded by causing the slidable rod to be retracted.

The invention claimed is:

1. An aircraft undercarriage including a leg for mounting on a structure of an aircraft so as to be movable between a deployed position and a retracted position, the aircraft undercarriage comprising:
    a breaker strut that is fitted to the aircraft undercarriage and that comprises:
    a first element and a second element that are hinged together at a knee, with the first element for coupling to the structure of the aircraft and the second element for coupling to the undercarriage;
    a return member being arranged between the first element and the second element to urge the first element and the second element towards a substantially aligned position that is defined by respective abutments,
    wherein one of the first element and the second element incorporates a linear actuator having a slidable rod that is coupled to the other of the first element and the second element by a link, and
    wherein moving the slidable rod of the actuator in a single direction causes, in succession, the first element and the second element of the breaker strut to move out of alignment and the undercarriage to move from the deployed position to the retracted position,
    wherein the linear actuator has a body in which the slidable rod slides and that forms the one of the first element and the second element that incorporates the linear actuator.

2. The undercarriage according to claim 1, wherein the abutments comprise firstly an end of a tab projecting from the one of the first element and the second element carrying the linear actuator, and secondly an end of the link that is hinged to the other of the first element and the second element.

3. The undercarriage according to claim 1, wherein the linear actuator is incorporated in the one of the first element and the second element that is coupled to the leg of the undercarriage.

4. The undercarriage according to claim 3, wherein the one of the first element and the second element that does not carry the linear actuator has a panel shape.

5. The undercarriage according to claim 1, wherein the body carrying coupling members for coupling the one of the first element and the second element that incorporates the linear actuator both to the other of the first element and the second element and also to one of the leg and the structure of the aircraft to which that of the first element and the second element that incorporates the linear actuator is coupled.

6. The undercarriage according to claim 5, wherein the slidable rod slides along a sliding axis that is contained in a plane defined by hinge axes of the one of the first element and the second element in which the slidable rod is incorporated.

7. The undercarriage according to claim 5, wherein the slidable rod slides along a sliding axis that does not lie in a plane defined by hinge axes of the one of the first element and the second element in which the slidable rod is incorporated.

* * * * *